United States Patent [19]
Wright

[11] 3,717,984

[45] Feb. 27, 1973

[54] BEAN VINE CUTTER

[76] Inventor: Roy Wright, Route 2, Box 38, Boone, Colo. 81025

[22] Filed: Sept. 13, 1971

[21] Appl. No.: 180,002

[52] U.S. Cl. ................................................56/229
[51] Int. Cl. ..........................................A01d 55/00
[58] Field of Search.........................56/229, 289, 314

[56] References Cited

UNITED STATES PATENTS

| | | | |
|---|---|---|---|
| 1,713,372 | 5/1929 | Brown | 56/229 X |
| 2,371,718 | 3/1945 | Speck | 56/289 X |

Primary Examiner—Louis G. Mancene
Assistant Examiner—J. A. Oliff
Attorney—Schellin & Hoffman

[57] ABSTRACT

A bean vine cutter is disclosed wherein a vertical bar is capable of being attached to a drawing vehicle such as a tractor. The bean vine cutter of the present invention is attached to the bottom portion of said bar. The bean vine cutter includes an elongated cutting knife having a forward portion with a triangular configuration and of decreasing thickness towards the front. The cutting knife is secured to a triangular plate which in turn overlies a triangular portion of a plate having a tail end. The tail end is secured to the bar. The bar also has a plurality of parallelly disposed rods extending rearwardly as a means for guiding the cut vines.

4 Claims, 4 Drawing Figures

PATENTED FEB 27 1973 3,717,984
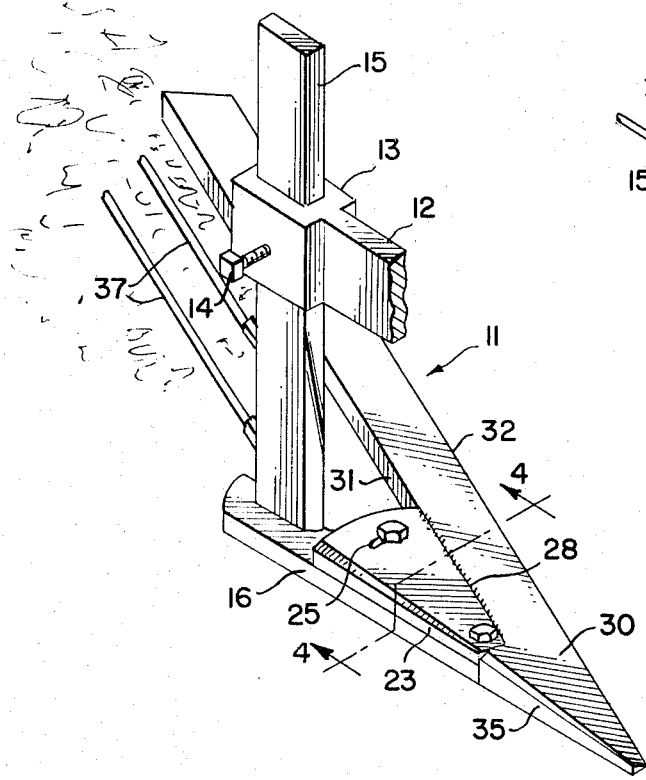
FIG. 1.
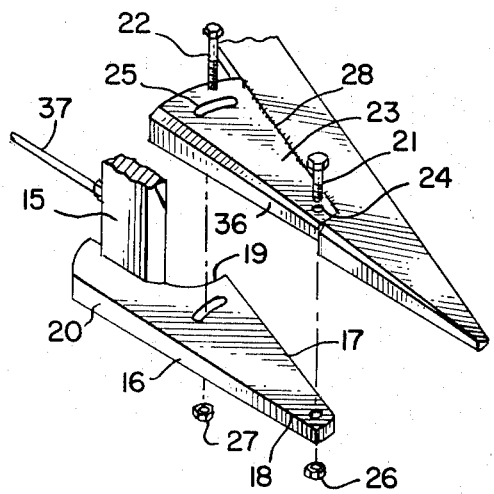
FIG. 3.
FIG. 4.
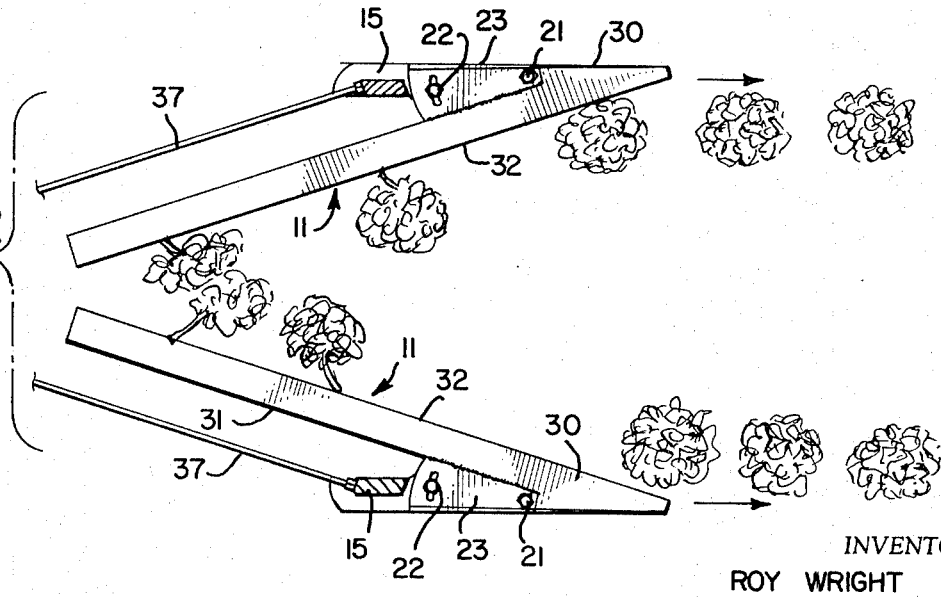
FIG. 2.
INVENTOR
ROY WRIGHT
BY Schellin & Hoffman
ATTORNEYS

BEAN VINE CUTTER

BACKGROUND OF THE INVENTION

During the last 100 years there has been considerable activity with regard to perfecting a bean vine cutting device having efficacy and being constructed simply so that it may be readily replaced in the field. The activity in this direction has occurred ever since vehicles have been constructed capable of carrying such cutters across a field. Preferably, it has been found desirable to mount a plurality of such cutting devices on the tractor, for instance, so that more than one row of bean vines may be cut at the same time. Most of the prior art bean vine cutting devices have been extremely complex in that the devices require considerable adjustment on a horizontal plane to achieve the desired results.

SUMMARY OF THE INVENTION

The present invention contemplates an ingenious configuration of cutting means with suitable mounting means. The cutting means of the present invention is an elongated knife-like device having a thickened base portion and a leading edge is sharpened for cutting purposes. The forward portion of the cutting means has a triangular configuration which, of course, will take the brunt of any object that is struck during a pass through a bean field. Additionally, the triangular portion descends in thickness towards the forward ends thereof. Behind the triangular portion and attached to the base of the cutting means is a plate of triangular shape. The cutting means is attached to one side of this triangular plate and lies in the same plane. This plate along with the cutting means attached thereto is secured to a horizontally disposed plate. In that area upon which the first mentioned plate overlies, the second plate is also of a triangular configuration so that at least two sides thereof are relatively flush therewith. A trailing end portion from the second plate comprises the means for securing a vertically disposed bar. This bar is utilized as the means to secure the bean vine cutting device of the present invention to a draw bar of a tractor, for instance. Elongated parallel horizontally disposed rods are secured to the vertical bar and extend rearwardly. These rods extend parallel with respect to the cutting means.

The first plate carrying the cutting means is secured to the second plate in an adjustable pivotable manner so that the cutting means may be adjusted and the acute angle varied.

DESCRIPTION OF THE DRAWINGS

FIG. 1 is a top perspective view of the bean vine cutting device of the present invention.

FIG. 2 shows a plurality of such bean vine cutting devices proceeding between two rows and shows a cutting action.

FIG. 3 is a fragmentary view of the device in an exploded manner to show the means for securing components of the device.

FIG. 4 is a cross-sectional view taken along line 4—4 of FIG. 1.

DETAILED DESCRIPTION OF THE INVENTION

Now, turning to the figures, attention is particularly directed to FIG. 1 from which one can see the bean vine cutting device of the present invention as identified, generally, by reference numeral 11. First of all, in fragmentary view is a portion of a draw bar 12 which is attached to a driving means such as a tractor, not shown. The draw bar terminates in a sliding member 13 having a perpendicularly disposed set bolt 14. It will be seen that a bar 15 is secured therein and is vertically disposed with respect to the draw bar 12. Bar 15 is attached at substantially the lowermost portion thereof to a first plate 16. For a better view of the general configuration of the first plate 16 attention is now directed to FIG. 3. It will be seen that the first plate 16 has a general triangular configuration for a portion thereof having sides 17, 18 and 19. The base side 19 has an extended trailing portion 20 to which the vertical bar 15 is secured as by welding or bolting and the like. It will also be seen from FIG. 3 that the triangular portion of the first plate 16 has upwardly extending bolts 21 and 22. Overlying this triangular portion of plate 16 is another triangular plate 23. Again, looking at FIG. 3, it will be seen that triangular plate 23 has a vertically disposed bore near one apex portion identified by reference numeral 24. At the other end there is a slot of arcuate fashion 25. The triangular plate 23 through the orifices 24 and 25 are designed to accept bolts 21 and 22 respectively. Nuts 26 and 27 are secured to their respective bolts. Plate 23 is designed to pivot about bolt 21 and slot 25 permits this activity as the bolts may be loosened and the triangular plate 23 moved in an arcuate manner to the extent permitted by slot 25. Along side edge 28 of the triangular plate 23, a cutting member 30 is secured thereto as by welding. The cutting member 30 is elongated and has a thickened base portion 31 and a cutting edge portion 32 opposite thereto and parallel for the most part.

For a better understanding of the cutting edge, attention is directed to FIG. 4. It will be seen from this figure that the bottom of the first plate 16 and the bottom of the cutting member 30 are substantially in the same plane and are disposed horizontally when the device of the present invention is in position. The cutting edge 32 is to the right of FIG. 4 and the upper surface thereof 33 ascends in thickness to form the base 31. It has been found desirable to construct plate 23 so that it also increases in thickness from where it is joined to the base of the cutting means. The resultant is a flush surface comprising the top of the cutting means 33 and the upper surface of plate 23.

It will also be seen that as the cutting member has a triangular configuration in the forward part thereof, side 35 and the side 16 and side 36 of plate 23 are also designed to be in a flush condition.

The cutting member 30 is at an acute angle with respect to the draw bar, for instance.

The vertical bar 15 is seen to have a plurality of horizontally parallel disposed rods 37 which extend rearwardly from the vertical bar and are attached thereto by a suitable means such as by welding or by insertion in apertures with utilization of appropriate set screws and the like. The function of the rods 37 is to assist in guiding the foliage portions of the bean vines as they are set up for cutting and then are permitted to fall in parallel rows in the field after they have been cut.

With respect to the utilization of the device of the present invention, attention is now directed to FIG. 2. FIG. 2 represents a top plan view of the device of the present invention showing at least two of such devices being dragged from left to right in the drawings through a field containing rows of bean vines. The acute angle disposition of the cutting member 30 achieves the desired cutting swath through the row. The cutting member 30 first engages a stem of the bean vine at a position proximate the triangular portion thereof. The cutting edge is then dragged across the stem so that the cutting action is prolonged and the cut is neatly accomplished without having to drag the bean vine by its roots out of the ground. Rods 37 are also parallel to the cutting edge 32. Any thickness of foliage is controlled by the horizontally disposed rods 37 so that the bean vine does not collapse about the cutting edge and cutting means as would occur if the horizontally disposed rods 37 were not employed. If the bean vines did in fact collapse about the cutting means, there would be less of a sliding action by the cutting means across the stem and a greater degree of dragging of the bean vine out of the ground. Consequently, it will be seen from the present invention that the device is quite ingenious.

Additionally, by employing a structure achieving excellent mating and flush machining of parts that first come in contact with obstructions and/or the bean vines, the device operates more efficiently in not being encumbered with unnecessary projections constituting restrictions of movement.

What is claimed is:

1. In a bean vine cutter that is drawn through rows of bean vines by a tractor including a draw bar,
   a. a vertically extending bar secured to said draw bar,
   b. a first horizontally extending plate having a triangular forward portion including a bottom surface and a base side; and a trailing portion extending from said base side, said trailing portion being secured to the lower end of said vertically extending bar,
   c. the triangular portion of said first plate having a vertically extending opening at its forward end and an arcuate slot adjacent to said base side,
   d. a second horizontally extending plate of triangular shape of substantially the same size and shape as the forward portion of said first plate and in overlying engagement therewith, said second plate having an opening in alignment with the opening in the forward portion of said first plate and an arcuate slot substantially in alignment with the arcuate slot in said forward portion,
   e. a pivot passing through said aligned openings,
   f. a bolt passing through said aligned slots and having a nut threaded on an end thereof, which, when tightened, secures said plates in a pivotally adjusted position,
   g. a cutting member having a thickened base portion, a cutting edge, a forward triangular portion over which said cutting edge extends, and a bottom surface lying in the plane of the bottom surface of said first plate, the base portion of said cutting member being welded to a side edge of said second plate at the rear of the forward portion thereof, said cutting member increasing in thickness from said cutting edge to said base portion while the forward portion of the cutting member increases in thickness from the forward end thereof to said second plate, and
   h. a horizontal vine guiding rod connected to and extending rearwardly from said vertically extending bar.

2. The attachment of claim 1 wherein one side of each of the first plate, the second plate and a side of the triangular portion of the cutting member are flush.

3. The attachment of claim 1 wherein at least two horizontal vine guiding rods are secured to said bar.

4. The attachment of claim 1 wherein the upper surface of the cutting member is flush with the upper surface of said second plate and the bottom of the said cutting member and the bottom of said first plate are horizontally disposed and flush.

* * * * *